United States Patent [19]
Yasui et al.

[11] Patent Number: 5,366,787
[45] Date of Patent: * Nov. 22, 1994

[54] PANEL STRUCTURE FABRICATION

[75] Inventors: Ken K. Yasui, Huntington Beach; Richard G. Pettit, La Habra, both of Calif.

[73] Assignee: McDonnell Douglas Corporation, Long Beach, Calif.

[*] Notice: The portion of the term of this patent subsequent to Oct. 22, 2009 has been disclaimed.

[21] Appl. No.: 964,716

[22] Filed: Oct. 22, 1992

Related U.S. Application Data

[63] Continuation-in-part of Ser. No. 709,695, Jun. 3, 1991, Pat. No. 5,204,161.

[51] Int. Cl.$^5$ .................... B32B 3/12; F04C 2/34
[52] U.S. Cl. .................... 428/174; 428/72; 428/178; 428/179; 428/182; 428/184; 428/185; 428/188; 52/785; 52/799; 52/806; 52/811; 244/119; 228/157
[58] Field of Search .............. 428/167, 172, 178, 188, 428/182, 185, 174, 72, 76, 120, 179, 184; 181/288, 290; 52/785, 795, 799, 806, 811; 244/117 R, 119, 123; 228/157

[56] References Cited

U.S. PATENT DOCUMENTS

| | | | |
|---|---|---|---|
| 3,193,434 | 7/1965 | Weiss | 428/178 |
| 3,574,103 | 4/1971 | Latkin | 428/185 |
| 5,204,161 | 4/1993 | Pettit | 428/174 |

Primary Examiner—Donald J. Loney
Attorney, Agent, or Firm—Max Geldin

[57] ABSTRACT

The structure and process for making a metallic panel structure from a plurality, e.g. two, core elements each comprised of a pair of sheets of superplastic material welded together along a plurality of weld lines, the weld lines of one core element being spaced differently or of different shape from the weld lines of the other core element. The core elements are joined together, with the weld lines of one core panel positioned at an angle, e.g., normal, to the weld lines of the adjacent core element. The resulting panel assembly is placed in a die. The die is heated to superplastic forming temperature, and gas pressure is applied to the spaces between the sheets of the respective core elements, causing superplastic forming and expansion of the sheets of each core panel to form a first series of bulges between weld lines of one core element, and a second series of bulges dissimilar in shape, e.g. larger, than the first series of bulges, between weld lines of the adjacent core element, the bulges expanding inwardly toward each other. The two series of bulges are orthogonally disposed, the bulges from the two core elements contacting and forming around each other. Further pressurization is applied to cause diffusion bonding at the contacting areas of the two series of bulges. The resulting structure is formed of two normally disposed series of bulges, one series larger than the other, with face sheets connected to such bulges.

17 Claims, 8 Drawing Sheets

FIG. 25 ions with minimum necking when deformed within a limited temperature and strain rate range. This characteristic, peculiar to certain metal and metal alloys has been known in the art as applied to the production of complex shapes. It is further known that at these same superplastic forming temperatures the same materials can be diffusion bonded with the application of pressure at contacting surfaces.

Diffusion bonding refers to the solid-state, metallurgical joining of surfaces of similar or dissimilar metals by applying heat and pressure for a time duration so as to effect intimate surface contact and cause comingling of atoms at the joint interface.

U.S. Pat. No. 4,304,821 to Hayase, et al discloses the structure and the process for making a metallic sandwich structure or box section panel in which metal worksheets, preferably made from titanium alloy, are joined in a preselected pattern by an intermittent or discontinuous weld. The joined sheets are sealed by a continuous weld to form an expandable envelope. Application of inert gas pressure to the envelope in a limiting fixture superplastically produces the sandwich structure as the expanded structure diffusion bonds to itself or other worksheets. Core configuration of the structure is determined by the weld pattern.

In U.S. application Ser. No. 709,695, filed Jun. 3, 1991, of R. G. Pettit and Ken K, Yasui, and assigned to the same assignee as the present invention, there is disclosed a stiffened lightweight panel structure comprising a first core panel or core element comprised of superplastic material and including a plurality of successive inwardly extending superplastically formed substantially similar first bulges or cells, and at least one other core panel or core element comprised of superplastic material adjacent the first core panel, and including a plurality of successive inwardly extending superplastically formed substantially similar second bulges or cells orthogonally disposed to and extending toward the first bulges, the second bulges formed around and contacting the first bulges, and the first and second bulges being diffusion bonded at the contacting areas. In this structure the bulges or cells of the respective core panels are of substantially the same size and geometric configuration, and the adjacent core panels and the bulges thereof are disposed normal to each other.

It is an object of the present invention to provide an improved panel structure or sandwich structure by superplastic forming and diffusion bonding.

Another object is the provision of a stiffened, lightweight panel structure with good resistance to bending, shear and buckling.

A further object is to provide improved stiffened panel structures having the aforementioned characteristics, formed from four to eight workpieces or sheets.

A still further object is the provision of improved superplastically formed panel structures wherein the size and geometry of the bulges or cells of the adjacent core panels of the panel structure can be varied and the orientation of the respective core panels can be varied, with respect to each other to increase or optimize structural efficiency.

Still another object is to provide a panel structure having passages for heat exchanger or laminar flow control applications.

Yet another object is the provision of superplastic forming and diffusion bonding procedure for producing the improved stiffened panel structures or sandwich panels of the invention.

Other objects and advantages of the invention will appear hereinafter.

SUMMARY OF THE INVENTION

Briefly, the present invention provides a metallic panel or sandwich structure and a method for producing same from a plurality of metal core elements or core panels comprised of superplastic material. By the term "superplastic material" employed herein is meant materials having the aforementioned superplasticity characteristics. Each core element is formed of a pair of metal sheets, each of the sheets comprised of a superplastic material. The sheets are welded together along a plurality of weld lines leaving spaces to permit free passage of gas between the sheets throughout the core panel.

According to one embodiment a pair of the core elements are joined together with the weld lines of one core element positioned at an angle, e.g. normal, to the weld lines of the other core element. The perimeter of the joined core elements are sealed and the resulting assembly is placed in a die, the distance between the weld lines of one core element being greater than the distance between the weld lines of the other core element. The die is heated to superplastic forming temperature, and gas pressure is applied to the spaces between the sheets of the respective core elements, causing superplastic forming and expansion of the sheets of each core element to form a series of bulges or cells between weld lines of one core element and a series of similar bulges between weld lines of the adjacent core element, the bulges expanding inwardly toward each other. Thus, two series of bulges from the adjacent core elements are produced which are disposed at an angle, e.g. orthogonally, and extend toward each other.

Sufficient pressure is applied to the spaces between the sheets of the respective core elements to cause sufficient expansion of the bulges from the two core elements so that they first contact each other and then further expand and form around each other. In the present invention, the bulges or cells of one core element are dissimilar, e.g. larger and/or of different shape than the bulges of the other core element. This is accomplished by controlling the forming rate of the bulges in each core element. During such expansion, further pressurization is applied to cause the oppositely disposed bulges to diffusion bond together at the contacting areas. The result is a four-sheet panel structure formed of the two angularly disposed series of dissimilar bulges, one series of bulges being larger than the other, with face sheets connected to such bulges, the bulges extending substantially from edge to edge of the core elements. Generally, the thickness of one core element containing one series of bulges is different from the thickness of the other core element containing the other series of bulges.

According to another embodiment, three core elements can be employed, and assembled together, with the weld lines of the first and third outer core elements parallel to each other and the weld lines of the intermediate second core element disposed at an angle, e.g. normal, to the weld lines of the two outer core elements, the weld lines of the second core element spaced apart a distance greater than the distance between the weld lines of the first and third core elements. When this assembly of three core elements are joined together and sealed around the outer periphery, and the resulting assembly subjected to superplastic forming and diffusion bonding as described above, a panel structure is produced having two outer series of inwardly extending parallel bulges and an intermediate series of bulges between the two series of outer bulges, such intermediate series of bulges being larger than the two series of outer bulges and being disposed at an angle, e.g. normal, to the two outer series of bulges. The result is a six-sheet panel structure. In an alternative embodiment, face sheets can be disposed adjacent the two outer series of bulges to form an eight-sheet panel structure.

In general the weld lines of the core elements are parallel lines. However, for certain applications the weld lines or webs forming the walls of the bulges may be non-parallel, e.g. divergent, curved, sine wave shaped or hexagon shaped, to increase structural efficiency, as shown hereinafter. Further, the weld lines in adjacent core elements may deviate from orthogonality, and may be oriented at an angle other than 90°, e.g. of about 60°. As noted above, weld line or web spacing between bulges may vary from core element to core element as well as within a core element in order to vary the resulting weld line or web spacing as required to optimize structural efficiency for a given application.

The result is a stiffened panel structure having improved buckling and shear resistance and particularly good bending resistance. This panel structure with unequal bulge or cell size and thickness between top and bottom of the structure, has additional structural stiffness plus increased strength in the face sheets, which normally buckle before the webs of the cells. The fabrication of the panel structure of the invention does not require extremely severe forming as in the case of the box section panel of above U.S. Pat. No. 4,304,821 and can thus be constructed of thinner materials or materials with reduced superplastic strain capability.

BRIEF DESCRIPTION OF THE DRAWINGS

FIG. 16 is a schematic cross-section of the assembly in the stage shown in FIGS. 14 and 14a;

FIG. 20 is a view similar to FIG. 14, illustrating application of pressure between the respective core elements of the assembly of FIG. 19, to superplastically form three series of bulges, as in FIGS. 14 and 14a;

DETAILED DESCRIPTION OF THE INVENTION AND PREFERRED EMBODIMENTS

As indicated above, the material to be superplastically formed must exhibit the characteristic of high tensile elongation with minimum necking when deformed within a limited temperature and strain rate range. While several materials demonstrate these superplastic properties, titanium and its alloys are currently the best known forming materials. Examples of other metals which have superplasticity characteristics include zirconium, aluminum, refractory metals, and alloys thereof. The superplastic temperature range varies with the specific alloy used. This temperature for titanium alloys is near 1700° F.

In addition to the superplastic properties, the material to be formed according to the invention must be suitable for diffusion bonding. Diffusion bonding temperatures can vary from 1450° F. to about 1850° F., e.g. about 1700° F. for 6A1-4V titanium alloy, and bonding pressure can vary from 100 psi to about 2,000 psi or more, usually from 150 to about 600 psi.

Sandwich panels or panel structures according to the invention are constructed by combining two or more core elements or core panels, as described below. Four, six and eight sheet panels are described, although sandwich panels containing a greater number of sheets can be constructed employing the same basic principles.

Figure 1:
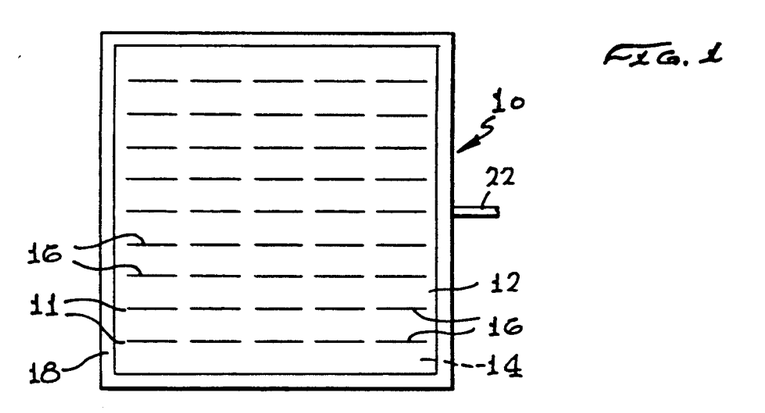
FIG. 1 is a plan view of a core element or core panel formed of a pair of seam welded superplastic metal sheets.
Figures 2, 3:
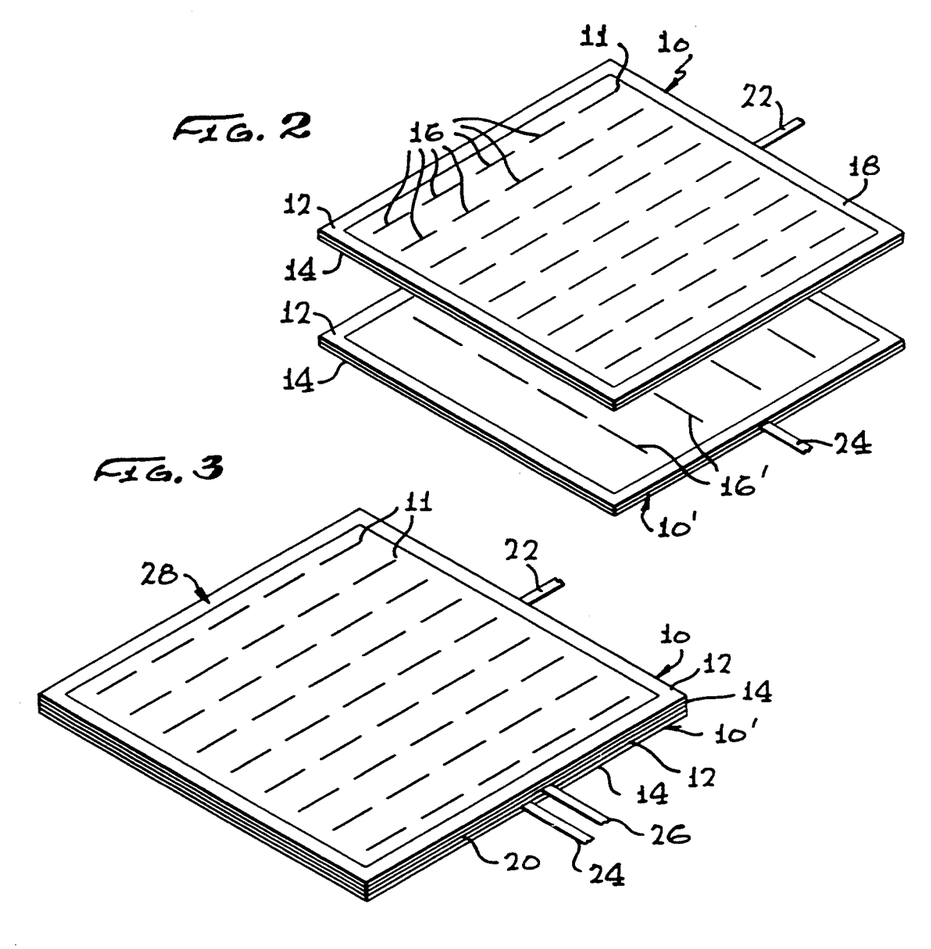
FIG. 2 is an exploded view of a two core element fabrication assembly for the production of a four-sheet panel structure according to the invention, the weld lines of one core element being spaced apart farther than the weld lines of the other core element.
FIG. 3 is a perspective view of the assembled core elements of FIG. 2.

A four-sheet panel is formed from two core elements or core panels, one of such core elements 10 being illustrated in FIG. 1. The core elements 10 and 10', shown in FIG. 2, are each constructed of two superplastic metallic sheets 12 and 14 seam welded together along a series of parallel weld lines 16 or 16'. An intermittent roll seam weld along weld lines 16 or 16', which is nothing more than a series of spot welds, is the preferred method. However, continuous welds separated by brief weld discontinuities sufficient to create minimum sized vent holes, or passages at the ends of the welds, as at 11, to permit uniform passage of gas to balance the gas pressure between the metal sheets of the core structure during the forming process, can be employed. It is noted that the distance between weld lines 16' of core element 10' is greater, e.g. twice as great, as the distance between weld lines 16 of core element 10. The two metallic sheets 12 and 14 are also welded at 18 around and adjacent the outer edges of the sheets, leaving a gas inlet at 22.

The two core elements 10 and 10' are overlaid, as illustrated in FIG. 2, with the parallel weld lines 16' of core element 10' normal to the parallel weld lines 16 of core element 10. The assembled core elements 10 and 10' are then welded together around the periphery, as indicated at 20 in FIG. 3. The gas inlet 22 provides for passage of gas into the top core element 10, and a gas inlet 24 is provided for introduction of gas into the bottom core element 10', and a gas inlet 26 is provided for introduction of gas into the space between the two core elements 10 and 10'.

Figure 4:
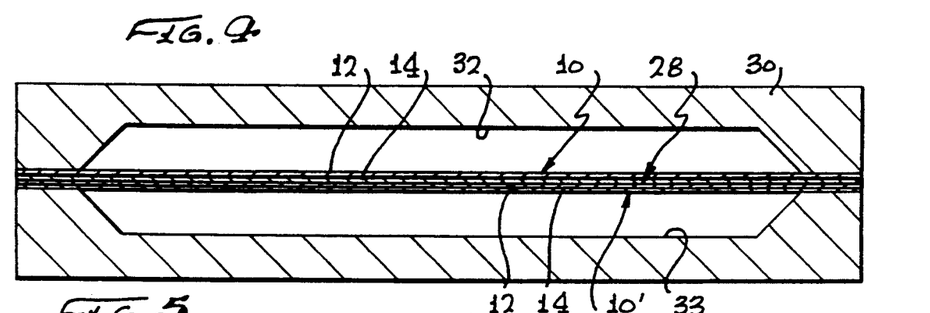
FIG. 4 is a cross section of a die containing the assembled core elements of FIG. 3.
Figure 5:
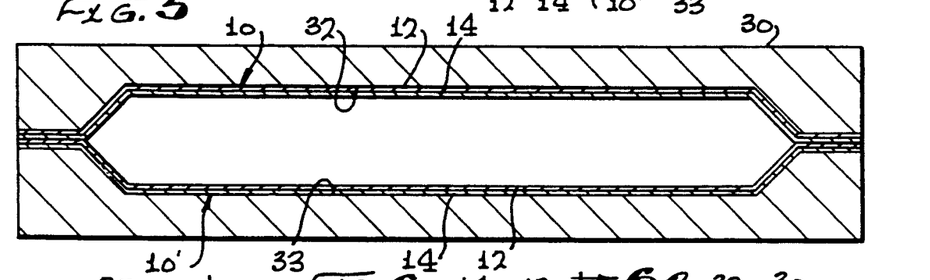
FIG. 5 illustrates application of pressure between the core elements of FIG. 4, to cause superplastic forming and expansion of the core elements against the walls of the die.
Figure 6:
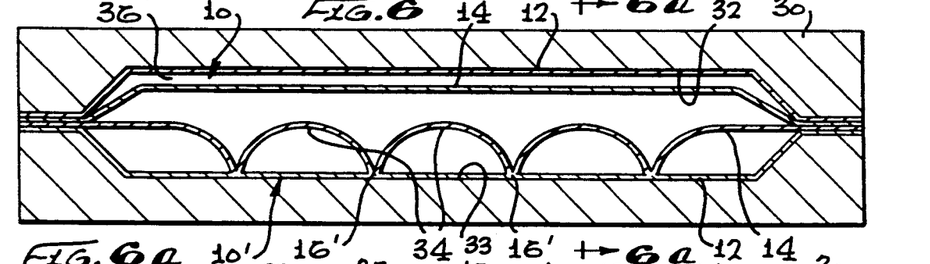
FIG. 6 illustrates application of pressure between the respective sheets of the two core elements, to superplastically form bulges between the weld lines of the respective core elements, the bulges of one core element being larger than and positioned normal to the bulges of the other core element.
Figure 6A:
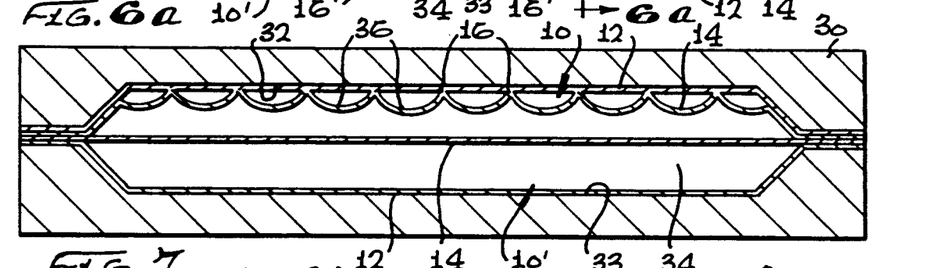
FIG. 6a is a section taken on line 6a–6a of FIG. 6, showing the smaller bulges of the other core element.
Figure 7:
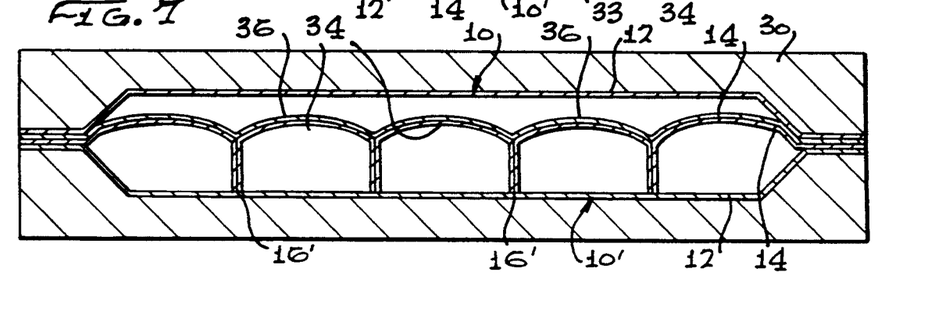
FIG. 7 illustrates formation of the bulges of different sizes of the two core elements around each other, and diffusion bonded, as result of continued application of pressure and heat to the assembly in the die.

The resulting assembly 28 of core elements 10 and 10' are placed in a heated die 30, as illustrated in FIG. 4. Pressure is first applied through gas inlet 26 between the two core elements 10 and 10' to cause superplastic forming and to expand the core elements 10 and 10' against the walls 32, 33 of the die, as seen in FIG. 5. While maintaining sufficient gas pressure between the core elements 10 and 10' to maintain the outer sheet 12 of core element 10 against the upper wall 32, and the lower sheet 14 of core element 10' against the lower wall 33 of the die cavity, pressure is applied through gas inlets 22 and 24 to the space between the respective sheets 12 and 14 of the two core elements 10 and 10'. Such pressure is higher than the pressure applied at 26 between the core elements, causing superplastic forming and expansion of the upper sheet 12 of lower core element 10' between the parallel weld lines 16' thereof, to form a series of successive bulges or cells 34 between adjacent weld lines 16', as illustrated in FIG. 6. Concurrently with the formation of the bulges 34 of the lower core element 10', superplastic forming and expansion of the lower sheet 14 of the upper core element 10 occurs, forming a series of bulges or cells 36 in core element 10, between the weld lines 16 thereof, as seen in FIG. 6a, the bulges 36 being positioned orthogonally or normal to the bulges 34 of core element 10' (see also FIG. 8), and upon continued application of gas pressure to core elements 10 and 10', such bulges 36 touch the apex of the bulges 34. The cores 10 and 10' are continued to be pressurized until the bulges 34 and 36 which are formed inwardly toward each other, form around and in contact with each other, as seen in FIG. 7.

It is noted that the bulges 36 formed between the more closely spaced weld lines 16 of core element 10 are substantially smaller than and dissimilar from the bulges 34 formed between the more widely spaced weld lines 16' of core element 10', and that the large bulges 34 continue to expand until they make contact with bulges 36. It has been found that a greater pressure is required to form the smaller bulges 36 than the larger bulges 34 when the thickness of the sheets in both core panels is the same. However, if the metal sheets of core panel 10 forming the smaller bulges 36 are thinner than the metal sheets of panel 10' forming the large bulges 34, then the same forming pressure can be used to form the smaller and larger bulges. The size of the smaller bulges 36 can be increased by adjusting pressure or time of forming of the smaller cells, but such structure is not preferred.

During contact and formation of the upper bulges 36 around the lower bulges 34, the pressure is increased to diffusion bonding pressure, e.g. 200 psi, and under the heat and pressure applied to the interior of the core elements 10 and 10', the contacting areas of the bulges 34 and 36 become diffusion bonded to each other. The resulting panel structure is then removed from the die.

Figures 8, 9, 10, 11:
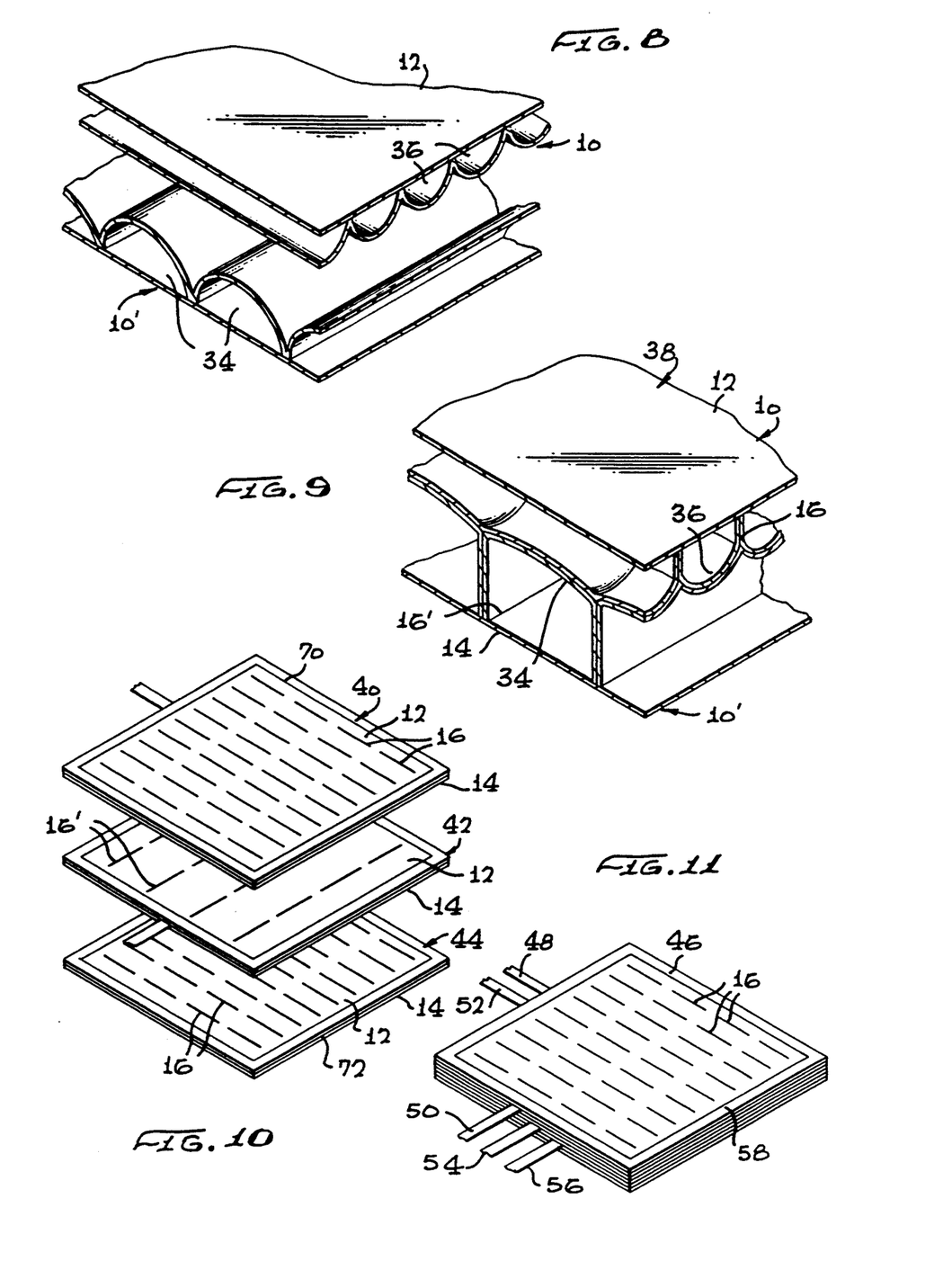
FIG. 8 is a schematic cross section of the assembly in the stage shown in FIGS. 6 and 6a, showing the bulges of the respective core elements extending normal to each other.
FIG. 9 is an isometric view of the final superplastically formed and diffusion bonded four-sheet core panel of the invention, at the stage illustrated in FIG. 7.
FIG. 10 is an exploded view of a three core element fabrication assembly for the production of a six-sheet panel structure according to the invention, the weld lines of the two outer core elements being parallel and the center core element having weld lines spaced farther apart than the weld lines of the two outer core elements and normal thereto.
FIG. 11 is a perspective view of the three assembled core elements of FIG. 10.

The resulting panel structure or sandwich panel 38 is illustrated in FIG. 9, and is comprised of a series of inwardly extending large bulges 34 and a series of inwardly extending small bulges 36 contacting and diffusion bonded to the bulges 34, bulges 36 being disposed orthogonally to bulges 34. The bulges 34 and 36 extend in length substantially from edge to edge of core elements 10' and 10, respectively. It will be noted that the outer sheet 12 of core element 10 and the outer sheet 14 of core element 10' which are maintained flat against the walls 32, 33 of the die, constitute outer face sheets of the panel structure. The result is the fabrication of a superplastically formed orthogonal trough bulge sandwich panel comprised of two dissimilar series of bulges 36 and 34, the cross sectional thickness of core element 10 containing the small bulges 36, being less than the cross sectional thickness of core element 10' containing the large bulges 34, as seen in FIG. 9. The two series of bulge 36 and 34 combine to produce a structure of improved buckling, bending and shear resistance. The reason for this is that for this type of structure the thinner core element 10 containing the smaller bulges 36 acts as a heavy and stiff face sheet that is stronger and more resistant to bending than an ordinary face sheet.

As an alternative to the four-sheet panel 38 comprised of contacting bulges 34 and 36 and outer face sheets 12 and 14, a six-sheet configuration employing the same structural concept of contacting dissimilar bulges noted above can be produced. Thus, as illustrated in FIG. 10, three core elements 40, 42 and 44, each comprised of sheets 12 and 14 are provided, core element 40 and 44 having a structure similar to the core element 10 and core element 42 similar to core element 10'. It will be noted that the upper and lower core elements 40 and 44 have their weld lines 16 parallel, whereas the center core element 42 is positioned with its weld lines 16' normal to the weld lines of core elements 40 and 44.

The three core elements 40, 42 and 44 are placed together, as illustrated in FIG. 11, and the sheets are joined by being welded around their periphery 46. Gas pressure inlets 48, 50 and 52 are provided for introduction of gas pressure into the top core element 40, the center core element 42 and the bottom core element 44. Gas pressure inlets 54 and 56 are also provided for introduction of gas between the upper and intermediate core elements 40 and 42, and between the bottom and intermediate core elements 44 and 42, respectively. The three core elements 40, 42 and 44 are then joined together by a peripheral weld 58.

Figure 12:
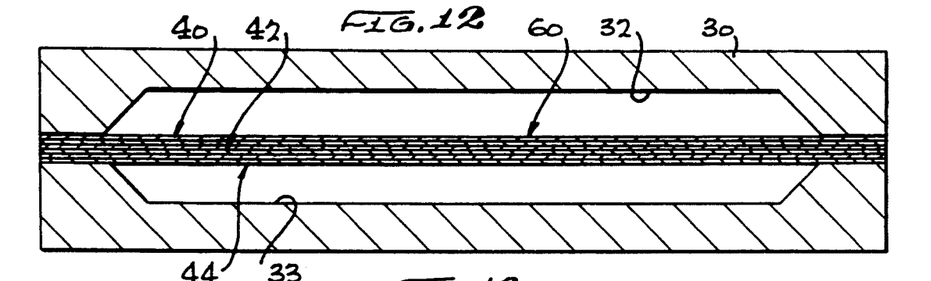
FIG. 12 is a cross section of a die containing the three assembled core elements of FIG. 11.
Figure 13:
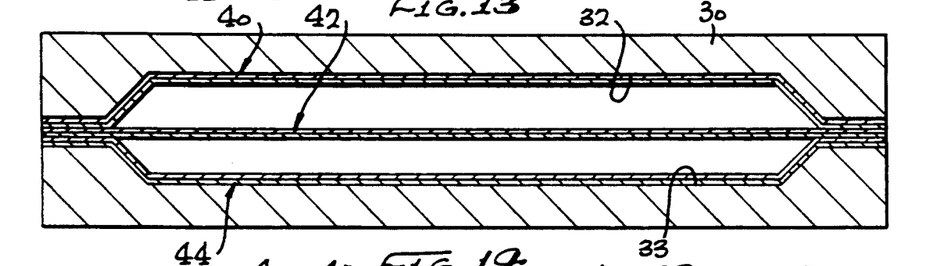
FIG. 13 illustrates application of pressure to cause superplastic forming and expansion of the two outer core elements into contact with the die cavity.

The resulting assembly 60 of joined core elements 40, 42 and 44 is then placed in a heated die 30, as seen in FIG. 12, and gas pressure is introduced through gas inlets 54 and 56 causing superplastic forming and expansion of the two outer core elements 40 and 44 into contact with the die cavity walls 32 and 33, the center core element 42 remaining in its initial position, as seen in FIG. 13.

Figure 14:
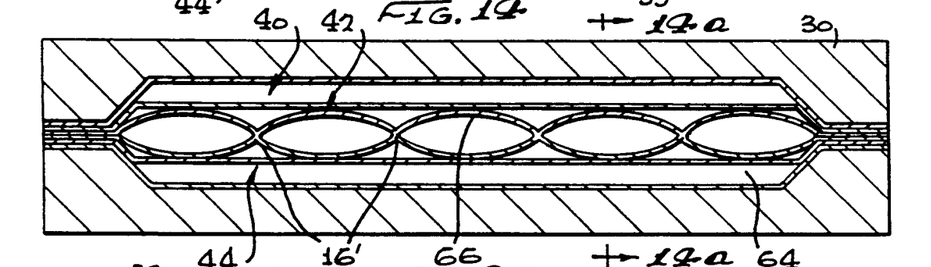
FIG. 14 illustrates application of pressure between the respective sheets of the three core elements of FIG. 13, to superplastically form three series of bulges between the weld lines of the three core elements of FIG. 13, the two series of bulges in the outer core elements being parallel, and smaller than and touching the larger bulges in the center core element, which are normal to the first two series of bulges.
Figure 14A:
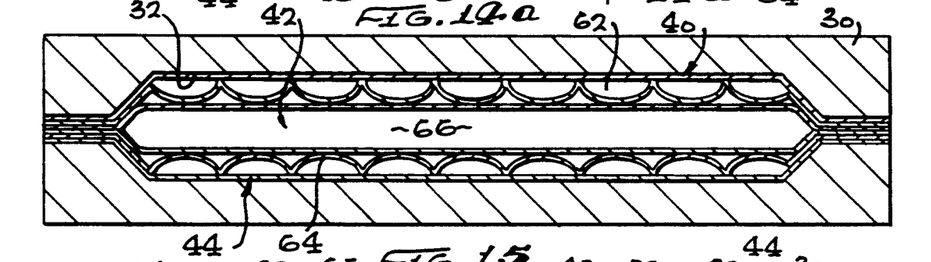
FIG. 14a is a section taken on line 14a–14a of FIG. 14.
Figure 16:
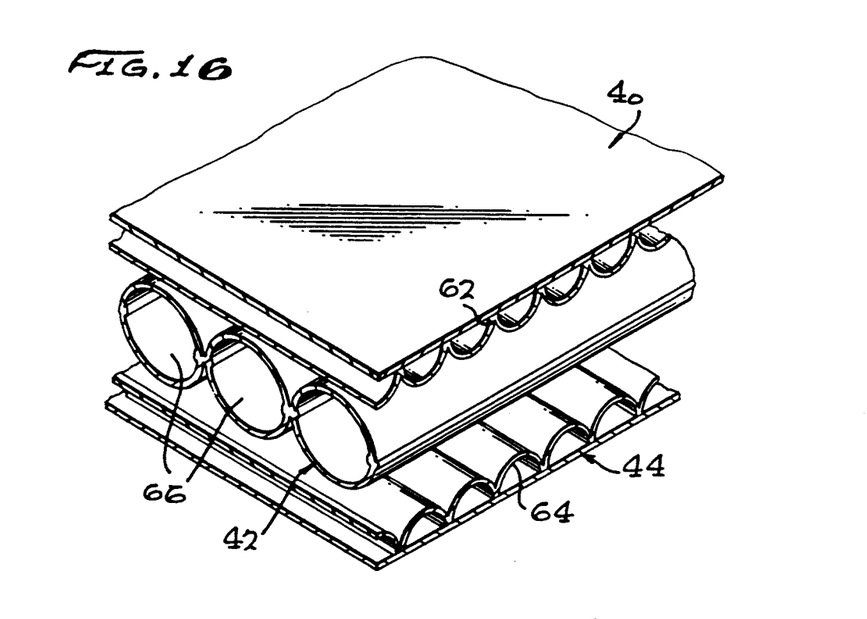

Pressure is then applied through gas inlets 48, 50 and 52 between the respective sheets of each of the core elements 40, 42 and 44, causing superplastic forming and expansion of the core elements 40 and 44 between weld lines 16 of each, to form a series of first small bulges 62 between the weld lines 16 of core element 40 and a series of parallel small bulges 64 from core element 44, as illustrated in FIG. 14a. At the same time a plurality of large double bulges 66 are formed in the center core element 42, between weld lines 16' thereof, normal to the bulges 62 and 64, as seen in FIG. 14, and bulges 66 touch the apex of both series of smaller bulges 62 and 64. This arrangement is more clearly illustrated in FIG. 16.

Figure 15:
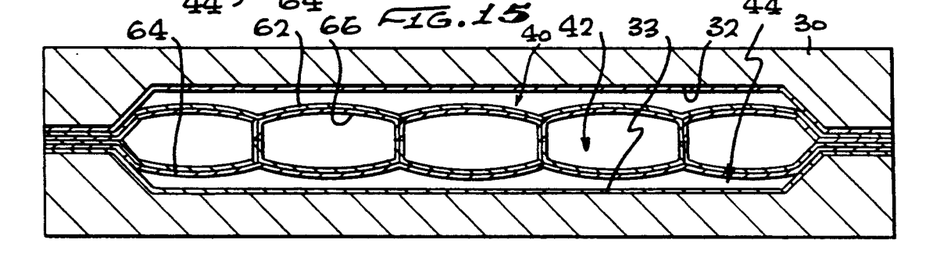
FIG. 15 illustrates formation of the larger bulges of the center core element around the smaller bulges of the two outer core elements, and diffusion bonding of the contacting bulges.

As pressure is further applied, the smaller bulges 62 of the upper core element 40 and smaller bulges 64 of lower core element 44 expand further and continue into contact with the upper and lower portions of large bulges 66 of center core element 42, until full contact therewith is made, as illustrated in FIG. 15. Pressure is then increased to cause diffusion bonding of larger bulges 66 of the center core 42 with the smaller bulges 62 and 64 of the two outer core elements 40 and 44.

Figure 17:
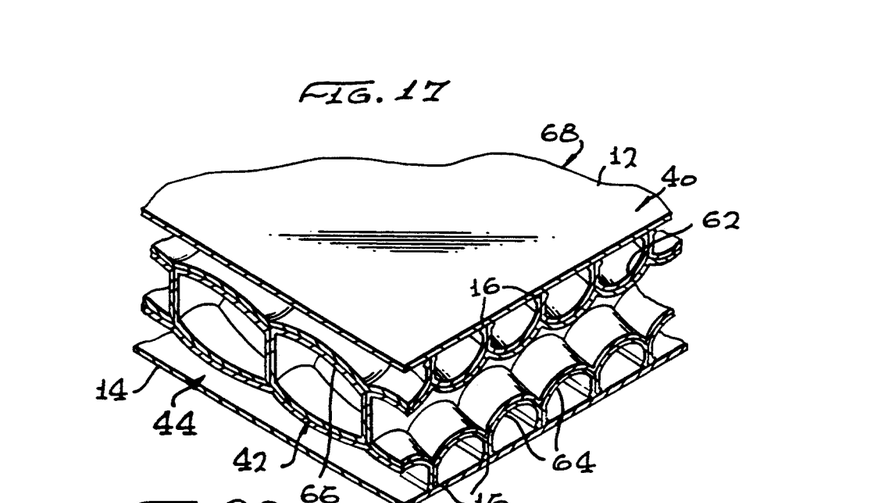
FIG. 17 is an isometric view of the final superplastically formed diffusion bonded six-sheet core panel at the stage shown in FIG. 15, having smaller parallel bulges in the two outer core elements and large bulges in the center core element normal to the smaller bulges in the two outer core elements.

FIG. 17 illustrates the resulting assembly of superplastically formed and diffusion bonded core elements 40, 42 and 44 shown in FIG. 15 to form a six-sheet orthogonal panel 68 formed of the superplastically produced bulges 62, 64 and 66 of core elements 40, 44, and 42, respectively, the outer series of bulges 62 and 64 being parallel, and the center series of bulges 66 being normal to bulges 62 and 64, and wherein the outer face sheets correspond to the sheet 12 of core element 40 and sheet 14 of core element 44. The bulges 62, 64 and 66 extend in length substantially from edge to edge of core elements 40, 44 and 42 respectively.

Figures 18, 19:
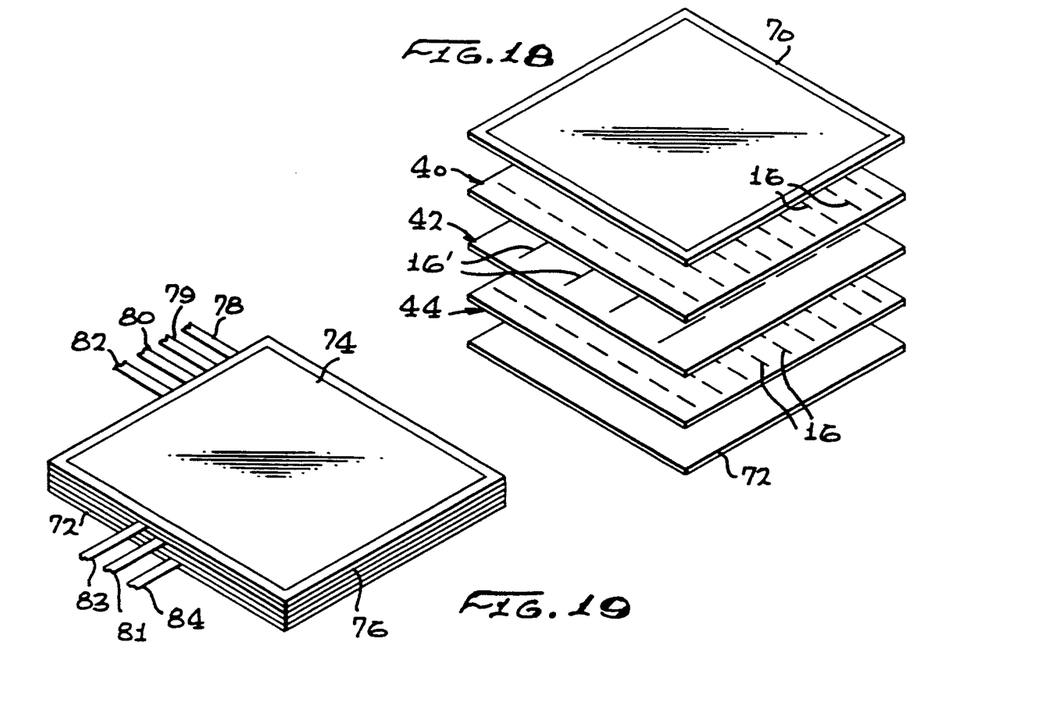
FIG. 18 is an exploded view of an assembly similar to FIG. 10, including three core elements, and also including two face sheets for the production of an eight-sheet panel structure according to the invention.
FIG. 19 is a perspective view of the assembled components of FIG. 18.

An eight-sheet panel structure according to the invention is illustrated below, as an extension of the six-sheet panel. Thus, referring to FIG. 18, the same arrangement of core elements or core panels 40, 42 and 44 are made as for the six-sheet embodiment illustrated in FIG. 10. Further, two face sheets 70 and 72 are provided adjacent the two outer core elements 40 and 44, respectively. This arrangement is placed together, as seen at 74 in FIG. 19, and welded around the periphery at 76, leaving gas ports for cavities between cores and face sheets. Thus, gas inlet 78 is provided between top face sheet 70 and top core element 40, gas inlet 79 to the top core element 40, gas inlet 80 to the bottom core element 44, gas inlet 81 to the center core element 42, and gas inlet 82 between bottom face sheet 72 and bottom core element 44. In addition, gas inlet 83 is provided for the cavity between the top and center core elements 40 and 42, and gas inlet 84 for the cavity between the bottom and center core elements 44 and 42.

The assembly 74 is placed in a heated die such as die 30, as in the case of the six-sheet embodiment as shown in FIG. 12. Gas pressure is applied through gas inlets 83 and 84, to the space between the top and center core elements 40 and 42, and to the space between the center and bottom core elements 42 and 44, to superplastically form and expand the outer face sheet 70 and outer core element 40, and outer face sheet 72 and outer core element 44, into contact with the outer walls 32 and 33 of the die cavity, as similarly illustrated in FIG. 13.

Figure 20:
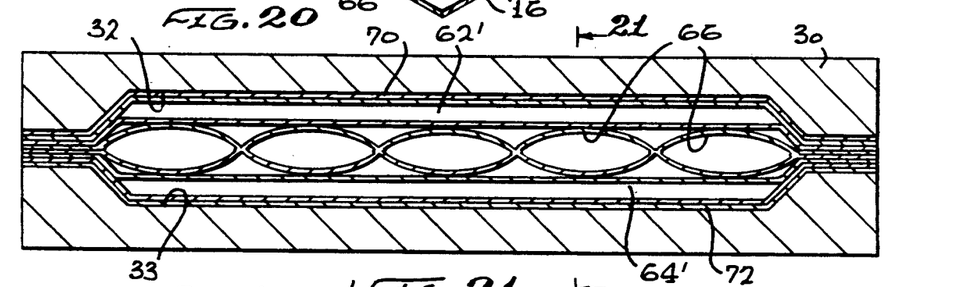
Figure 21:
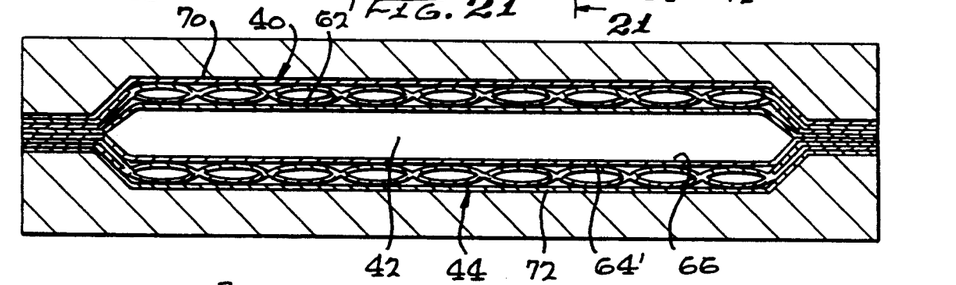
FIG. 21 is a section taken on line 21–21 of FIG. 20.
Figure 22:
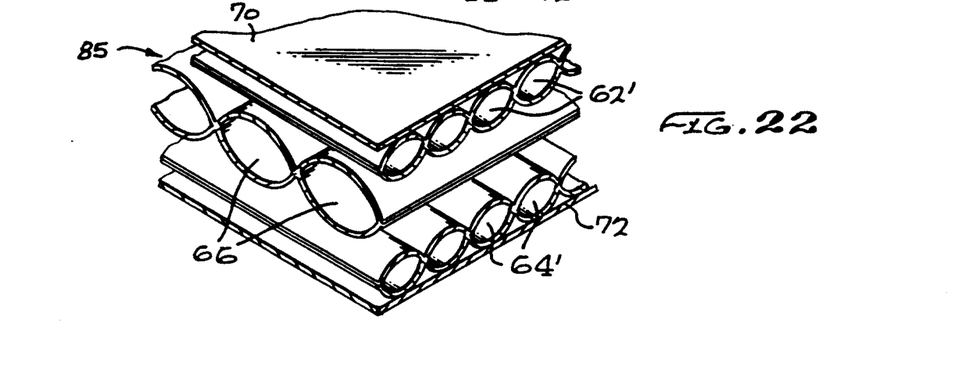
FIG. 22 is an isometric view of the assembly in the stage shown in FIGS. 20 and 21, similar to FIG. 16.

Gas pressure is then introduced through gas inlets 78–82, causing superplastic forming and expansion of the areas between weld lines 16 in each of the core elements 40, and 44, and between weld lines 16' in core element 42, until all the smaller bulges, as at 62' and 64' touch the opposite apices of the large bulges 66, as illustrated in FIGS. 20 and 21. However, in this embodiment, as seen in FIGS. 20 and 21, the two outer series of smaller bulges 62' and 64', as well as the large center bulges 66, are double bulges, due to the presence of outer face sheets 70 and 72, which remain fixed against the walls 32 and 33 of the die cavity 30 during superplastic forming. This arrangement is more clearly illustrated at 85 in FIG. 22.

Superplastic forming and expansion continues until the bulges 64' and 66 of the core elements 44 and 42 make full contact and form around each other, and the bulges 62' and 66 of the core elements 40 and 42 make full contact and form around each other, as similarly illustrated in FIG. 15. Pressure is then increased to diffusion bond the contacting areas of the bulges formed around each other and also to diffusion bond face sheet 70 to bulges 62' and to diffusion bond face sheet 72 to bulges 64'.

Figure 23:
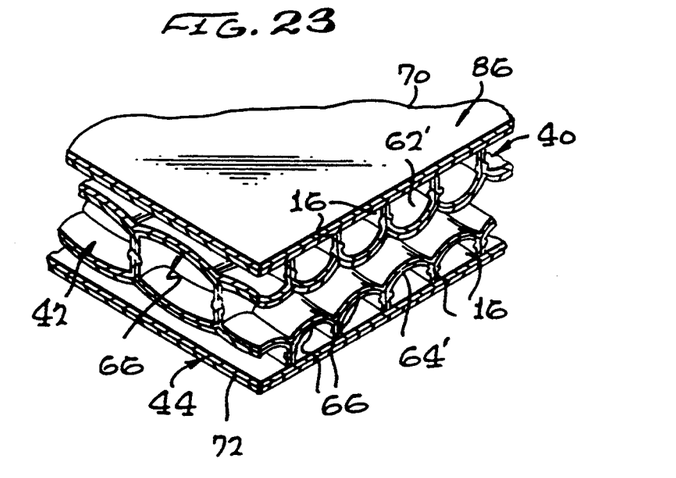
FIG. 23 is an isometric view of the final eight-sheet core panel produced by additional superplastic forming and diffusion bonding of the assembly of FIGS. 20 and 21, similar to FIG. 17.

The resulting eight-sheet panel structure 86 is illustrated in FIG. 23. This structure is similar to the six-sheet panel shown in FIG. 17 in comprising two outer series of small bulges 62' and 64' interconnected to a series of orthogonally positioned or normal large center bulges 66. However, in the eight-sheet embodiment, there are separate face sheets 70 and 72 diffusion bonded to the small bulges 62' and 64' respectively Also, viewing FIG. 23, the weldments at 16 between bulges 64' of core element 44, and between bulges 62' of core element 40 are displaced inwardly along the bulges from face sheets 72 and 70, whereas in the six-sheet embodiment shown in FIG. 17, the weldments 16 are at the juncture of the bulges 62 and 64 and the face sheets 12 and 14.

If desired, more sheets can be employed to provide additional bulges and stiffness, according to the invention concept. More sheets also reduce the degree of forming required to fill deep spaces.

Figure 24:
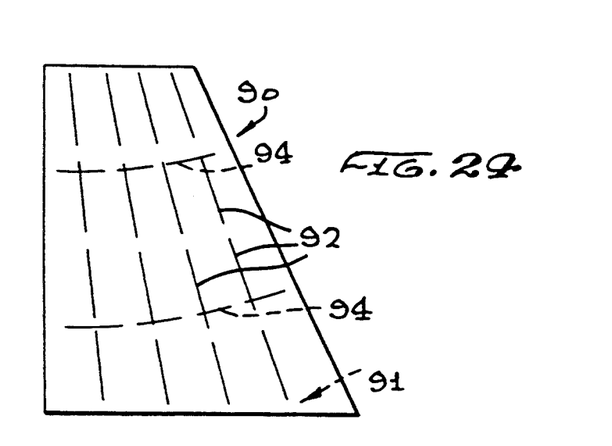
FIG. 24 schematically illustrates core elements having non-parallel or divergent weld lines in combination with a core element having curved weld lines.

The weld lines between the core panels used in forming the panel structure of the invention can be other than in the form of straight parallel weld lines, as illustrated at 16 in FIG. 1. Thus, such weld lines can be non-parallel, e.g. divergent, curved, sinusoidal or even hexagon shaped. Referring to FIG. 24, a core element 90 corresponding to core element 10 in FIG. 1 can be formed from divergent weld lines 92. An adjacent core element 91 such as core element 10' in FIG. 2 can be formed from curved weld lines illustrated at 94.

Figure 25:
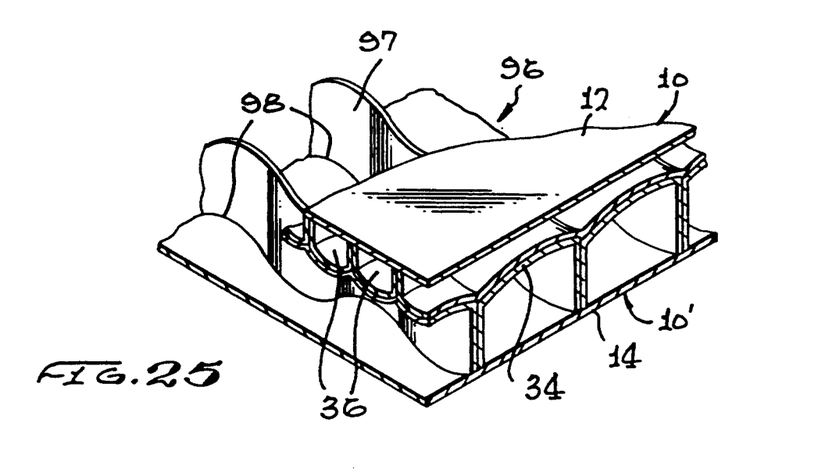
FIG. 25 illustrates a panel structure similar to FIG. 9, but wherein the weld lines of one of the core elements has a sine wave shape.

FIG. 25 illustrates a four sheet panel structure 96 similar to the four-sheet panel structure 38 of FIG. 9, but wherein the weld lines 98 of core element 10' are in the shape of a sine wave, instead of the straight parallel lines 16' of FIG. 9, forming the sine wave shaped webs 97 between adjacent larger bulges 34. A panel structure with a curved, i.e. sine wave, weld pattern as shown in FIG. 25 provides additional resistance to shear load.

Figure 26:
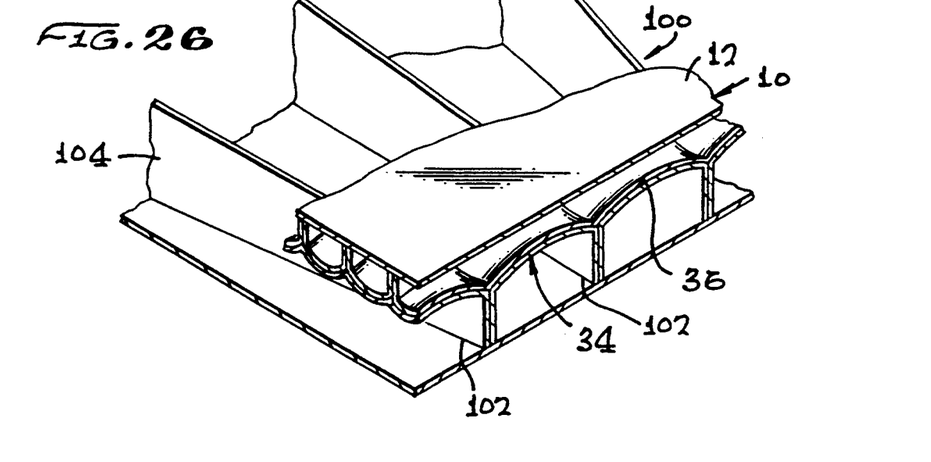
FIG. 26 is a partly broken away cross-section of a panel structure similar to FIG. 9, but wherein the weld lines or webs between adjacent bulges of one of the core elements are divergent.

FIG. 26 illustrates a four sheet panel structure 100 similar to the four sheet panel structure of FIG. 9, but wherein the weld lines 102 of core element 10' are divergent weld lines instead of the parallel weld lines 16' of FIG. 9, forming the divergent webs 104 between adjacent larger bulges 34. A panel structure as shown in FIG. 26 utilizing divergent weld lines can have utility, for example, as a vertical stabilizer.

Figure 27:
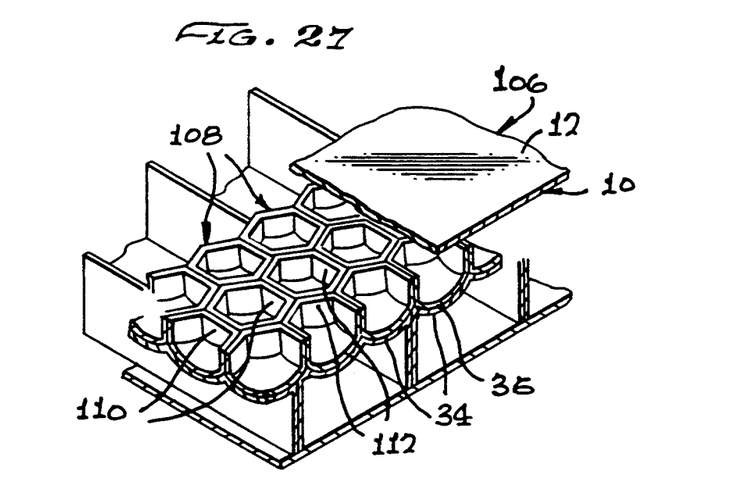
FIG. 27 illustrates a panel structure similar to FIG. 9, but wherein the weld lines of one of the core elements are hexagon shaped.

FIG. 27 illustrates a four sheet panel structure 106, similar to the four-sheet panel 38 of FIG. 9, but wherein the weld lines of upper core panel 10 are hexagon shaped, that is forming adjacent hexagons 108 containing parallel lines such as at 110, and forming hexagon shaped webs 112 between adjacent small bulges 36.

Figure 28:
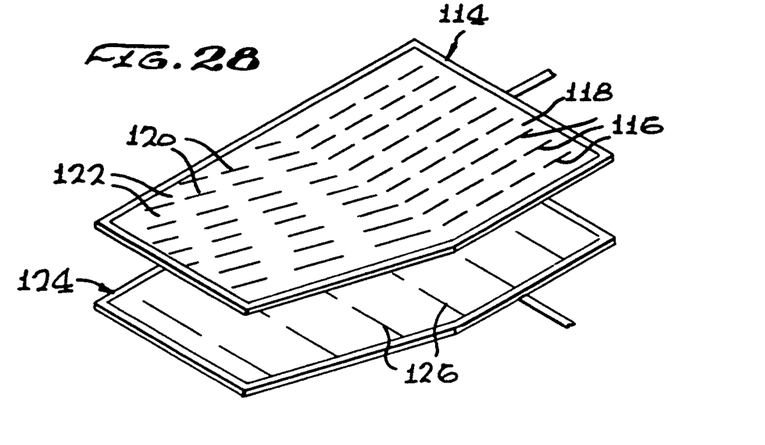
FIG. 28 is an exploded view similar to FIG. 2 of a two core element fabrication assembly wherein some of the weld lines of one of the core elements deviate from orthogonality with respect to the weld lines of the adjacent core element.

Further, the weld lines, e.g. parallel weld lines of adjacent core elements as in FIG. 2 can be oriented at an angle, other than normal or at a 90° angle as in FIG. 2. Thus, referring to FIG. 28, core element 114, corresponding to core element 10 in FIG. 2, can have a plurality of parallel weld lines 116 in one portion 118, connected to a plurality of parallel weld lines 120 in an adjacent portion 122 of element 114, weld lines 120 being at an angle to weld lines 116. Core element 114 is welded to a core element 124 of a shape similar to core element 114, core element 124 having parallel weld lines 126 positioned further apart than weld lines 116 and 120. It is seen that weld lines 126 of core element 124 are positioned normal to weld lines 116 of core element 114, but at an angle other than 90° to weld lines 120 of core element 114.

The panel structure of the invention can be employed in any application in which a lightweight stiffened structure is useful, as in components of automotive vehicles and particularly aerospace vehicles.

From the foregoing, it is seen that a novel superplastically formed orthogonal bulge sandwich panel, providing a lightweight stiffened panel structure having increased resistance to bending and buckling, particularly in the face sheets, and a novel method of fabrication thereof, are provided according to the invention.

Since various changes and modifications of the invention will occur to those skilled in the art within the spirit of the invention, the invention is not to be taken as limited except by the scope of the appended claims.

What is claimed is:

1. A panel structure comprising
a first core element comprised of superplastic material, said superplastic material being a metal or a metal alloy having superplasticity characteristics, and including a plurality of successive inwardly extending superplastically formed first bulges, and
at least one other core element comprised of superplastic material adjacent said first core element, and including a plurality of successive inwardly extending superplastically formed second bulges disposed at an angle to and extending toward said first bulges, said second bulges being dissimilar to said first bulges, said second bulges being formed around and contacting said first bulges, and said first and second bulges being diffusion bonded at the contacting areas.

2. The panel structure of claim 1, the bulges of said at least one other core element being of different size from the bulges of said first core element.

3. The panel structure of claim 1, said first bulges being of substantially the same size, and said second bulges being of substantially the same size, but different in size from said first bulges.

4. The panel structure of claim 1, including first spaced weld lines defining said first bulges, said first weld lines being parallel lines, and second spaced weld lines defining said second bulges, said second weld lines being parallel lines spaced apart a distance greater than said first parallel weld lines, said second bulges being larger than said first bulges.

5. The panel structure of claim 4, said second bulges being orthogonally disposed to said first bulges.

6. The panel structure of claim 4, said second bulges being disposed at an angle other than 90° to said first bulges.

7. The panel structure of claim 1, including first spaced weld lines defining said first bulges and second spaced weld lines defining said second bulges, at least said first weld lines or said second weld lines being non-parallel.

8. The panel structure of claim 1, including first spaced weld lines defining said first bulges and second spaced weld lines defining said second bulges, at least said first weld lines or said second weld lines being curved.

9. The panel structure of claim 1, including first spaced weld lines defining said first bulges and second spaced weld lines defining said second bulges, at least said first weld lines or said second weld lines being of sine wave shape.

10. The panel structure of claim 1, including first spaced weld lines defining said first bulges and second spaced weld lines defining said second bulges, at least said first weld lines or said second weld lines being hexagon shaped.

11. The panel structure of claim 1, including a face sheet connected to said first bulges and a face sheet connected to said second bulges.

12. The panel structure of claim 1, each of said core elements formed of a pair of superplastic metal sheets, said sheets of each core element welded together along a plurality of spaced weld lines, the weld lines of said at least one other core element being spaced apart a distance greater than the weld lines of said first core element and disposed normal to the weld lines of said first core element, the first bulges on said first core element being formed between adjacent weld lines thereof and the second bulges on said second core element being formed between adjacent weld lines thereof, said second bulges being larger than said first bulges.

13. The panel structure of claim 11, employing a pair of said core elements and forming a four-sheet panel structure.

14. The panel structure of claim 1, said at least one other core element being a second core element and including a third core element comprised of superplastic material adjacent said second core element, said third core element including a plurality of superplastically formed third bulges disposed at an angle to and extending toward said second bulges, said third bulges being similar to said first bulges and being formed around and contacting said second bulges, said first and third bulges being parallel, and said second and third bulges being diffusion bonded at the contacting areas.

15. The panel structure of claim 14, each of said core elements formed of a pair of metal sheets, each comprised of a superplastic material, said sheets of each core element being welded together along a plurality of parallel weld lines, the weld lines of said first and third core elements being parallel, and the weld lines of said second core element being spaced apart a distance greater than the weld lines of said first and third core elements, and being disposed normal to the weld lines of said first and third core elements, the first bulges on said first core element being formed between adjacent weld lines thereof, the second bulges on said second core element being formed between adjacent weld lines thereof, and the third bulges on said third core element being formed between adjacent weld lines thereof, said second bulges being larger than said first and third bulges.

16. The panel structure of claim 15, including a first face sheet forming one of the sheets of said first core element and connected to the first bulges at the weld lines on said first core element, and a second face sheet forming one of the sheets of said third core element and connected to said third bulges at the weld lines on said third core element, and forming a six-sheet panel structure.

17. The panel structure of claim 15, and including a first separate face sheet contiguous to and diffusion bonded to the first bulges on said first core element and a second separate face sheet contiguous to and diffusion bonded to the third bulges on said third core element, and forming an eight-sheet panel structure.

* * * * *